United States Patent [19]

Torii et al.

[11] Patent Number: 5,292,066
[45] Date of Patent: Mar. 8, 1994

[54] SEALANT FLOW CONTROL METHOD IN SEALING BY AN INDUSTRIAL ROBOT

[75] Inventors: Nobutoshi Torii, Hachioji; Tatsuo Karakama, Yamanashi; Hitoshi Mizuno, Koganei, all of Japan

[73] Assignee: Fanuc Ltd., Minamitsuru, Japan

[21] Appl. No.: 945,976

[22] PCT Filed: Mar. 6, 1992

[86] PCT No.: PCT/JP92/00272
§ 371 Date: Nov. 4, 1992
§ 102(e) Date: Nov. 4, 1992

[87] PCT Pub. No.: WO92/15401
PCT Pub. Date: Sep. 7, 1992

[30] Foreign Application Priority Data

Mar. 7, 1991 [JP] Japan ................... 3-065213

[51] Int. Cl.$^5$ ............................. B05B 17/04
[52] U.S. Cl. ........................ 239/1; 239/69; 901/43; 427/10
[58] Field of Search ............ 901/43; 239/1, 67, 68, 239/69, 70; 427/10; 118/696

[56] References Cited

U.S. PATENT DOCUMENTS

| | | | |
|---|---|---|---|
| 3,890,922 | 6/1975 | Nordenholt | 118/696 |
| 4,614,300 | 9/1986 | Falcoff | 239/69 |
| 4,720,801 | 1/1988 | Boll | 118/696 |
| 4,822,647 | 4/1989 | Nozaki et al. | 118/696 |
| 5,046,666 | 9/1991 | Ono | 901/43 |

FOREIGN PATENT DOCUMENTS

| | | | |
|---|---|---|---|
| 3822835 | 3/1990 | Fed. Rep. of Germany | 239/69 |
| 2166066 | 4/1986 | United Kingdom | 901/43 |
| 8803440 | 5/1988 | World Int. Prop. O. | 239/67 |

*Primary Examiner*—Andres Kashnikow
*Assistant Examiner*—Christopher G. Trainor
*Attorney, Agent, or Firm*—Staas & Halsey

[57] ABSTRACT

A sealing gun (31) of a sealant application unit, which controls the flow of the sealant in accordance with the value of an input signal, is attached to the end of a robot arm. The value of a signal applied to the sealant application unit (30) is controlled in association with acceleration/deceleration control of the moving speed of the sealing gun. The moving speed (TSA) of the sealing gun and the flow (SC) of the sealant discharged from the sealing gun are in direct proportion; therefore, the bead width becomes uniform independently of the moving speed (TSA) of the sealing gun.

4 Claims, 10 Drawing Sheets

SEALANT FLOW CONTROL METHOD IN SEALING BY AN INDUSTRIAL ROBOT

DESCRIPTION

1. Technical Field

The present invention relates to a method for performing sealing of machines and apparatuses such as motorcars and electric equipment by industrial robots.

2. Background Art

When applying a sealant to a section to be sealed of a machine or apparatus by using a sealant application unit, the sealant bead width is dependent on the flow of the sealant discharged from a sealing gun of the sealant application unit and the moving speed of the sealing gun. It is desirable for a bead width to be maintained uniform, and conventionally, a program is taught to an industrial robot for operating the sealing gun at a constant speed.

It is impossible, however, to maintain a constant speed when the robot is operatively accelerated or decelerated or when the robot is operated along a complicated trajectory. On the other hand, it is necessary to change the moving speed of the sealing gun in order to meet the requirements for more accurate moving trajectories and a shorter cycle time of sealing work. Thus, even when the moving speed of the sealing gun is variable, it is necessary to control the amount of the sealant to be applied, depending on the moving speed of the robot. In the past, however, there has been no such sealant application unit that is highly responsive in controlling the flow of the sealant, mainly due to the extremely high viscosity and resulting high sealing pressure (application pressure) of the sealant.

Recently, a sealant application unit has emerged, which features very good responsiveness and which is capable of controlling the flow of a sealant in accordance with the magnitude of an input signal (input voltage).

DISCLOSURE OF THE INVENTION

An object of the present invention is to provide a sealant flow control method for the sealing work using an industrial robot, whereby the flow of the sealant can be controlled in proportion to the moving speed of a sealing gun by using a sealant application unit which is capable of controlling the flow of the sealant according to the value of the input signal.

The present invention has solved the aforesaid problem by installing a sealing gun of a sealant application unit, which controls the flow of a sealant in accordance with the value of an input signal, on the distal end of an arm of an industrial robot, determining a command signal to be applied to the sealing unit based on a commanded moving speed at which the sealing gun is moved; controlling the value of the command signal in association with the acceleration/deceleration control of the moving speed of the sealing gun; and supplying a signal, whose value is proportional to the moving speed of the sealing gun, to the sealant application unit to control the flow of the sealant in proportion to the moving speed of the sealing gun.

The sealant application unit is supplied with a signal whose value is in proportion to the moving speed of the robot, i.e., that of the sealing gun. Moreover, the value of signal changes in proportion to the moving speed of the sealing gun even when the acceleration or deceleration of the moving speed of the sealing gun is in progress, so that the amount of sealant discharged from the sealing gun is in proportion to the moving speed of the sealing gun. As a result, the bead width becomes uniform regardless of the moving speed of the sealing gun.

BRIEF DESCRIPTION OF THE DRAWINGS

FIG. 2 is an explanatory drawing of a delay time for turning a gun ON;

BEST MODE FOR CARRYING OUT OF THE INVENTION

Figure 1:
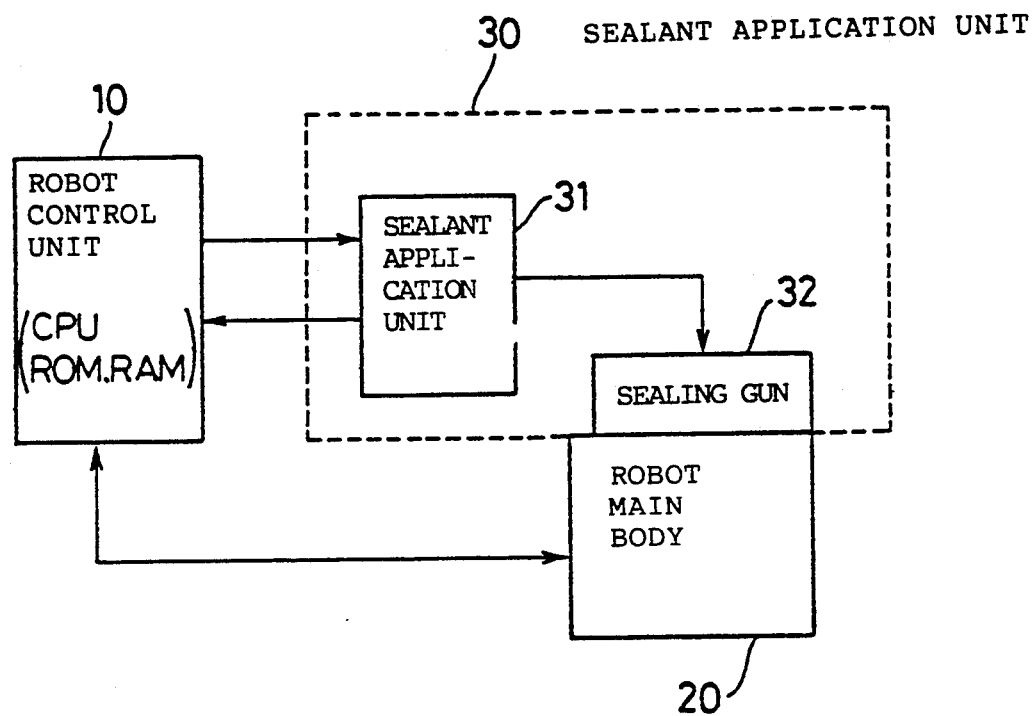
FIG. 1 is a block diagram of an industrial robot for implementing an embodiment according to the present invention.

FIG. 1 is the block diagram of the industrial robot which carries out the sealing work to implement the embodiment of the present invention. 10 denotes a numerical control unit serving as a robot control unit for controlling a robot main body 20, and it is equivalent to a conventional robot control unit mainly comprising a processor (CPU), memories such as ROMs and RAMs, and I/O circuits. Further, 30 denotes a sealant application unit. It is a type of sealant application unit that controls the flow of a sealant in proportion to a command voltage issued by the robot control unit 10, and it consists of a sealing gun control unit 31 and a sealing gun 32. The sealing gun 32 is attached to the distal end of an arm of the robot main body 20. The robot is driven to apply the sealant to the objects of sealing of motorcars and various types of machines while moving the sealing gun 32.

First, the codes for a sealing start command and a sealing end command are provided. In this embodiment, SS, b is provided as the sealing start command, and SE, t2' is provided as the sealing end command. In the aforesaid sealing start command SS, b, "b" sets a sealing condition data number. For this number, the following sealing conditions are set and stored in a memory of the robot control unit 10 in advance:

Sealing flow f (cc/m),
Command constant c (V/(cc/sec))
Servo delay time t1 (ms)
Gun ON delay time t2 (ms)

For example, the sealing conditions are preset as shown in Table 1:

TABLE 1

| Flow rate f | Command constant c | t1(*) | t2(**) |
| --- | --- | --- | --- |
| N000 20.0 cc/m | 0.30 v/(cc/s) | 32 ms | 32 ms |
| N001 30.0 cc/m | 0.30 v/(cc/s) | 32 ms | 0 ms |
| N002 15.0 cc/m | 0.30 v/(cc/s) | 32 ms | 0 ms |

TABLE 1-continued

| Flow rate f | Command constant c | t1(*) | t2(**) |
|---|---|---|---|
| N003 20.0 cc/m | 0.30 v/(cc/s) | 32 ms | 32 ms |
| N004 20.0 cc/m | 0.30 v/(cc/s) | 32 ms | 32 ms |

(*)Servo delay time
(**)Gun ON delay time

The sealing flow "f" represents the flow of the sealant discharged from the sealing gun 32, and the constant "c" represents a conversion constant for determining a command voltage V to be supplied to the sealant application unit 30 based on the sealing flow "f" and a commanded speed F (the moving speed of the sealing gun) of the robot. The servo delay time t1 refers to the time lag from the moment the robot control unit 10 has issued an operation command to the moment the robot actually operates, and it needs to be adjusted to the moving speed because it slightly changes depending on the moving speed. The gun ON delay time t2 represents the time difference between the point at which the sealing start command SS is issued and the point for start of the actual sealing work. When it is desired that sealing be started at a positioned point, the gun ON delay time t2 is set to "0." If positioning is to be ignored, then the setting is determined based on the moving speed of the robot (sealing gun) and a positioning ignoring rate X (%). More specifically, the start of sealing is delayed by the aforesaid gun ON delay time t2 from the completion of the pulse distribution for a block in which the sealing start command is set. The gun ON delay time t2 is determined by the following formula (1):

$$t2 = \frac{\sqrt{Fm}}{\sqrt{Fm} + \sqrt{FmH}} \times \text{Acceleration/Deceleration time} \times \sqrt{\frac{X}{100}} \quad (1)$$

where Fm is the speed for reaching a state where positioning is ignored, and FmH is the speed after reaching the state where positioning is ignored.

Figure 2:
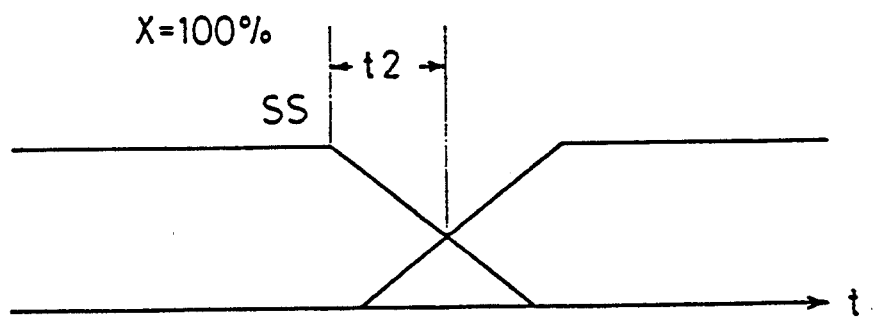

Concerning this gun ON delay time t2, as shown in FIG. 2, the value of the position ignoring rate X is determined so that the gun ON delay time t2 provides a point at which the speed obtained by deceleration in accordance with the moving command in the block where the sealing start command SS is set coincides with the speed obtained by acceleration in accordance with the moving command set in the next block, after the pulse distribution for the former block is completed. If there is no change in the moving speed, then the positioning ignoring rate X is set to 100%. As a result, the midpoint between the acceleration and deceleration sections becomes the starting point of sealing as shown in FIG. 2.

The command voltage V to be applied to the sealant application unit 30 is determined by performing calculation according to the formula 2 below:

$$V = (F/1000) \times f \times c \quad (2)$$

Further, t2' of the sealing end command SE, t2' is the gun delay time according to which the sealing end command SE delays the turning OFF of the sealing gun by the set time t2' after the pulse distribution for the block in which the sealing end command SE is set is completed. The gun OFF delay time t2' is also set to "0" when turning the gun OFF at a positioned point, while it is determined in the same manner as the aforementioned gun ON delay time t2, when positioning is to be ignored.

Thus, when teaching operations to a robot, the sealing start command SS, b, and the sealing end command SE, t2' are programmed in this teaching program, and the sealing condition that corresponds to "b" of the abovementioned sealing start command SS, b, is also preset. Upon start of the robot operation, the robot starts its operation in accordance with the program that has been taught, and controls the amount of a sealant discharged according to the moving speed of the robot (the moving speed of the sealing gun) to obtain a uniform bead section.

Figure 3:
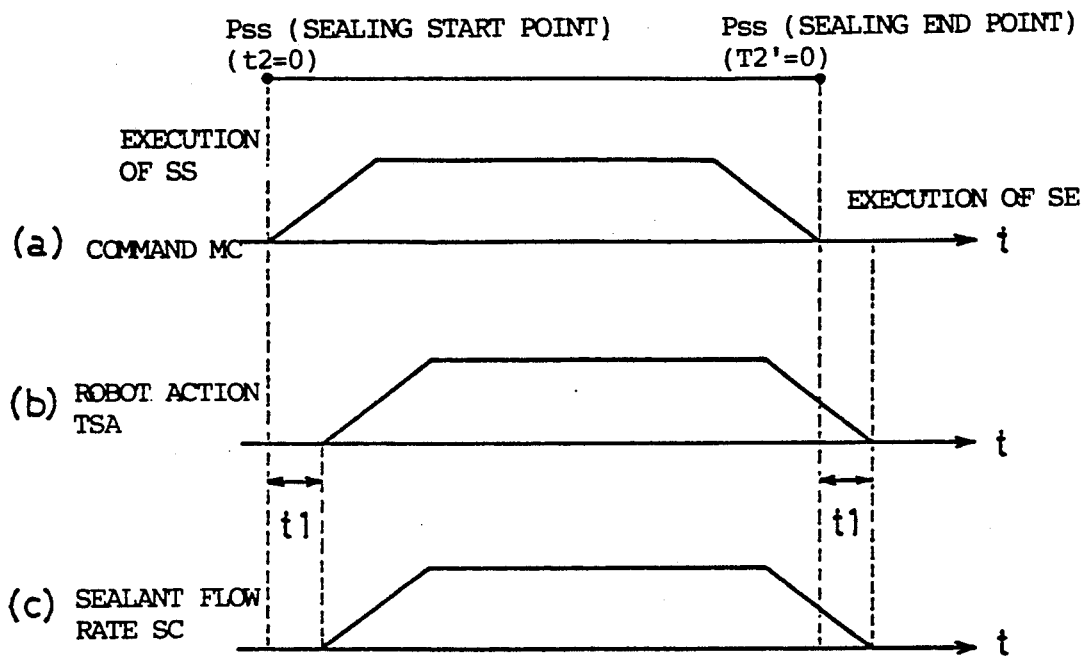
FIG. 3 is an explanatory drawing for a case where sealing is started and ended at positioned points.

FIG. 3 through FIG. 6 are explanatory drawings which illustrate the relationship between the command MC given to the robot, the robot action TSA, and the sealant flow SC. FIG. 3 shows the operations in a case where the sealing start position Pss and the sealing end position Pse are positioned points. In this case, the gun ON delay time t2 and this gun OFF delay time t2' are both set for "0."

The command MC given to the robot is subject to acceleration/deceleration to gradually reach the commanded speed. On the other hand, the robot action TSA follows the above-mentioned command, delaying by the servo delay time t1. The sealant flow SC is also controlled in synchronization with the robot action TSA. Consequently, the sealant flow SC is determined in proportion to the moving speed of the robot (sealing gun). Upon completion of sealing, the robot action TSA and the sealant flow SC are synchronized so that both stop at the same time, delaying from the command MC by the servo delay time t1, in the same pattern.

Figure 4:
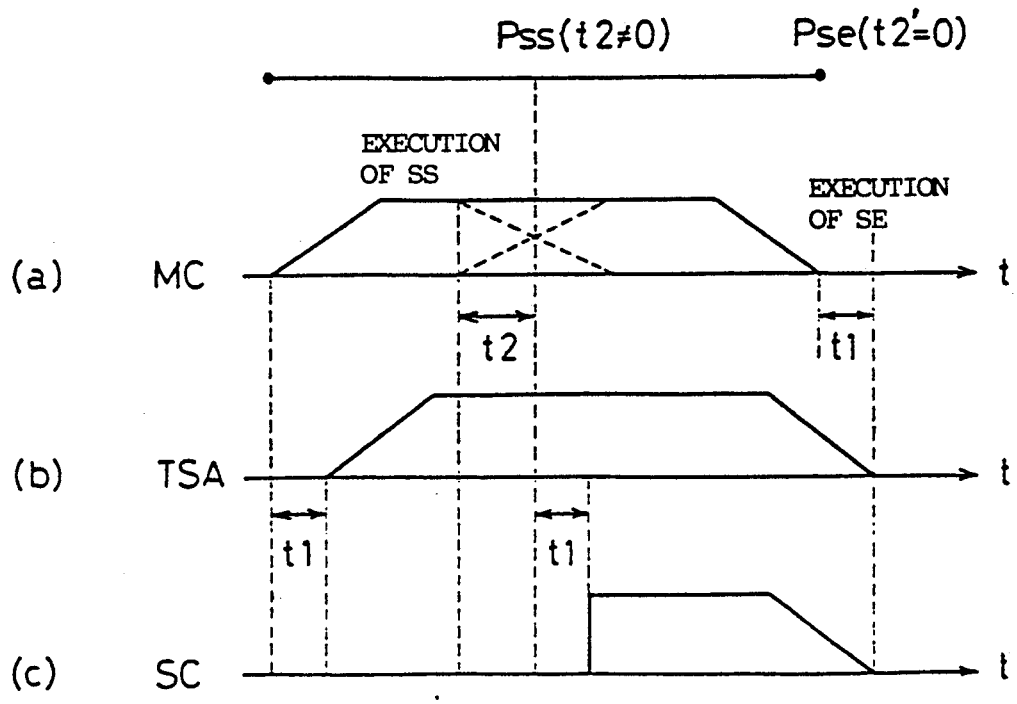
FIG. 4 is an explanatory drawing for a case where sealing is started with positioning ignored, but ended with positioning performed.

FIG. 4 shows an example wherein sealing is begun at the sealing start position Pss, which is delayed from the sealing start command SS by the gun ON delay time t2 with positioning being ignored, and the sealing is terminated at a positioned point Pse (t2=a set value, t2'=0); the robot action TSA delays from the command MC by the servo delay time t1; the sealing start time delays from the sealing start command by t1+t2; and the sealing is terminated simultaneously with the stop of the robot action.

Figure 5:
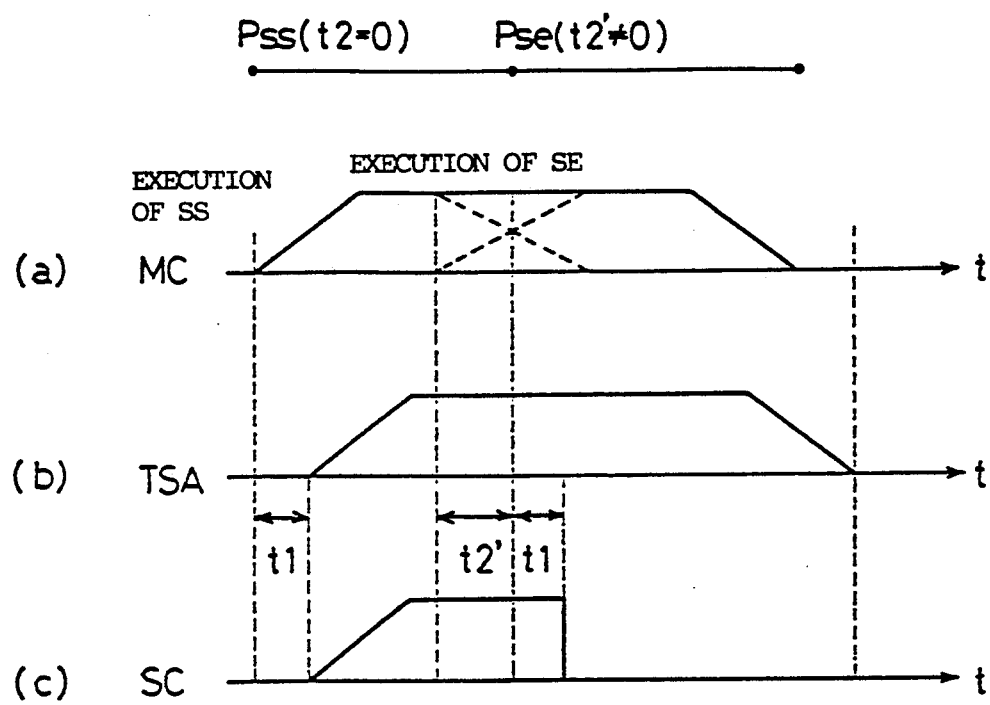
FIG. 5 is an explanatory drawing for a case where sealing is started at a positioned point, but ended with positioning ignored.

FIG. 5 shows an example wherein sealing is started at a positioned point but ended with positioning ignored. In this case, t2 is "0" and t2' is a set value.

Figure 6:
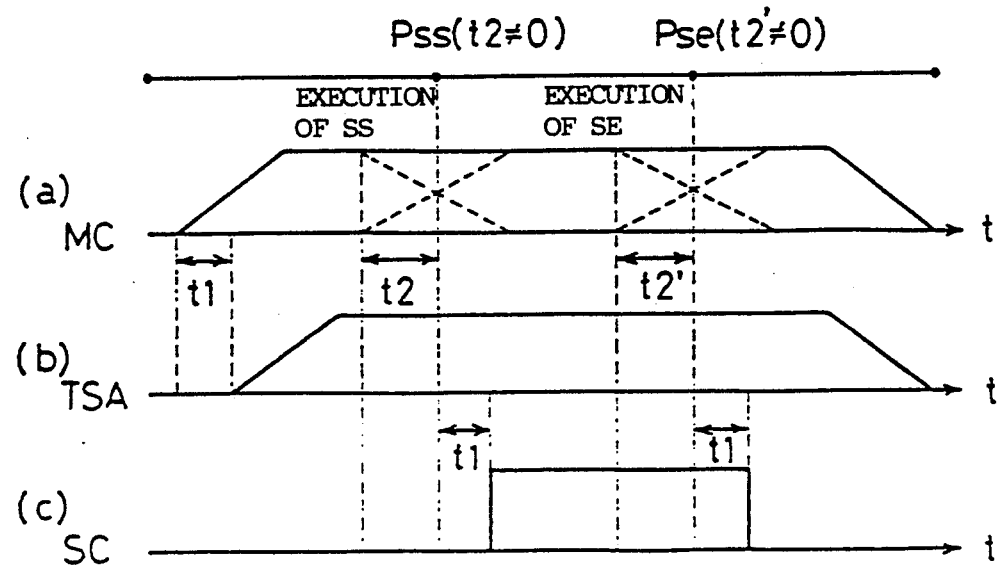
FIG. 6 is an explanatory drawing for a case where sealing is started and ended with positioning ignored.
Figure 7A:
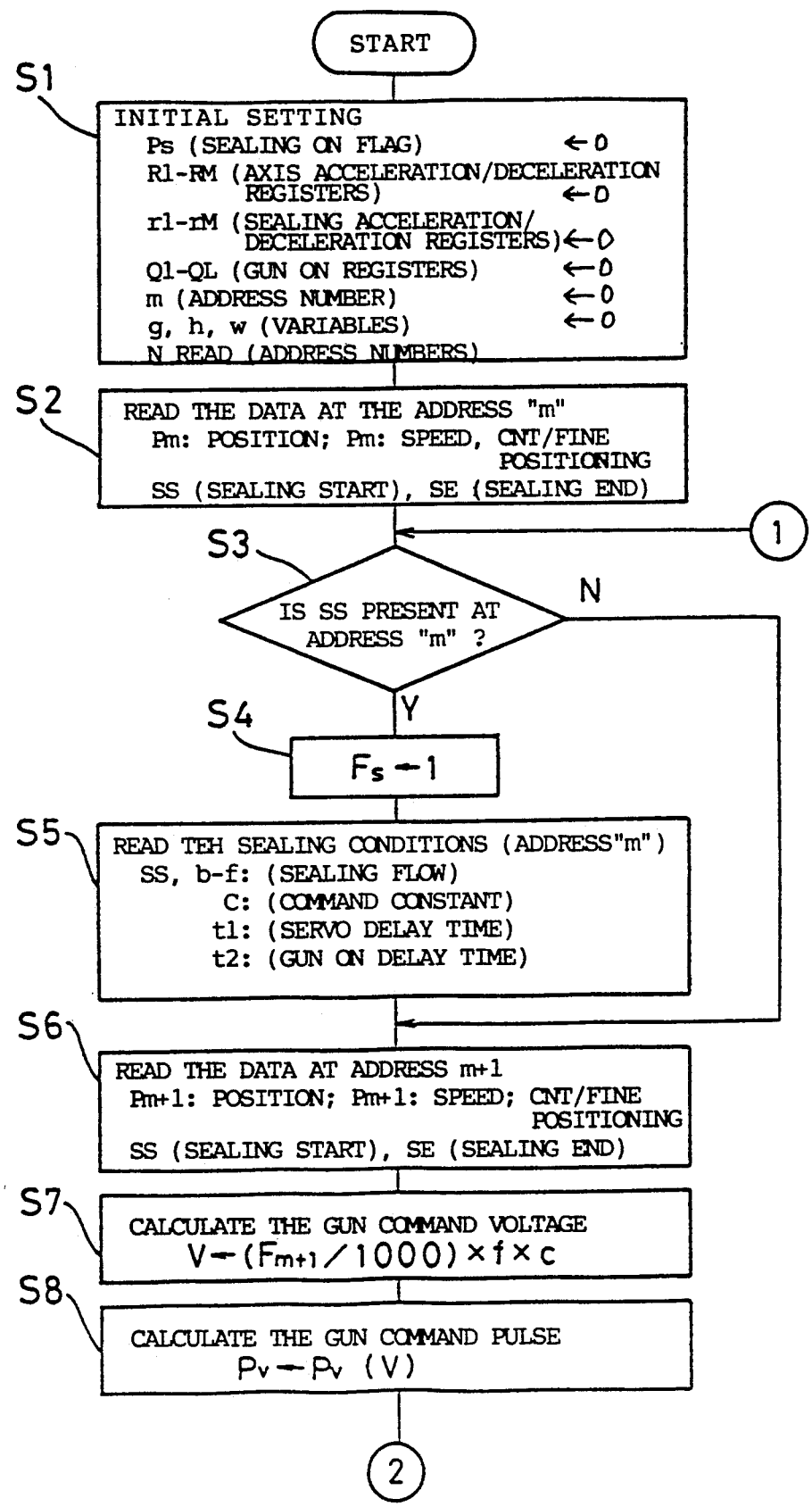
FIG. 7(a) through (f) are flowcharts of the processing performed by a processor of the industrial robot in the embodiment of the present invention.
Figure 7B:
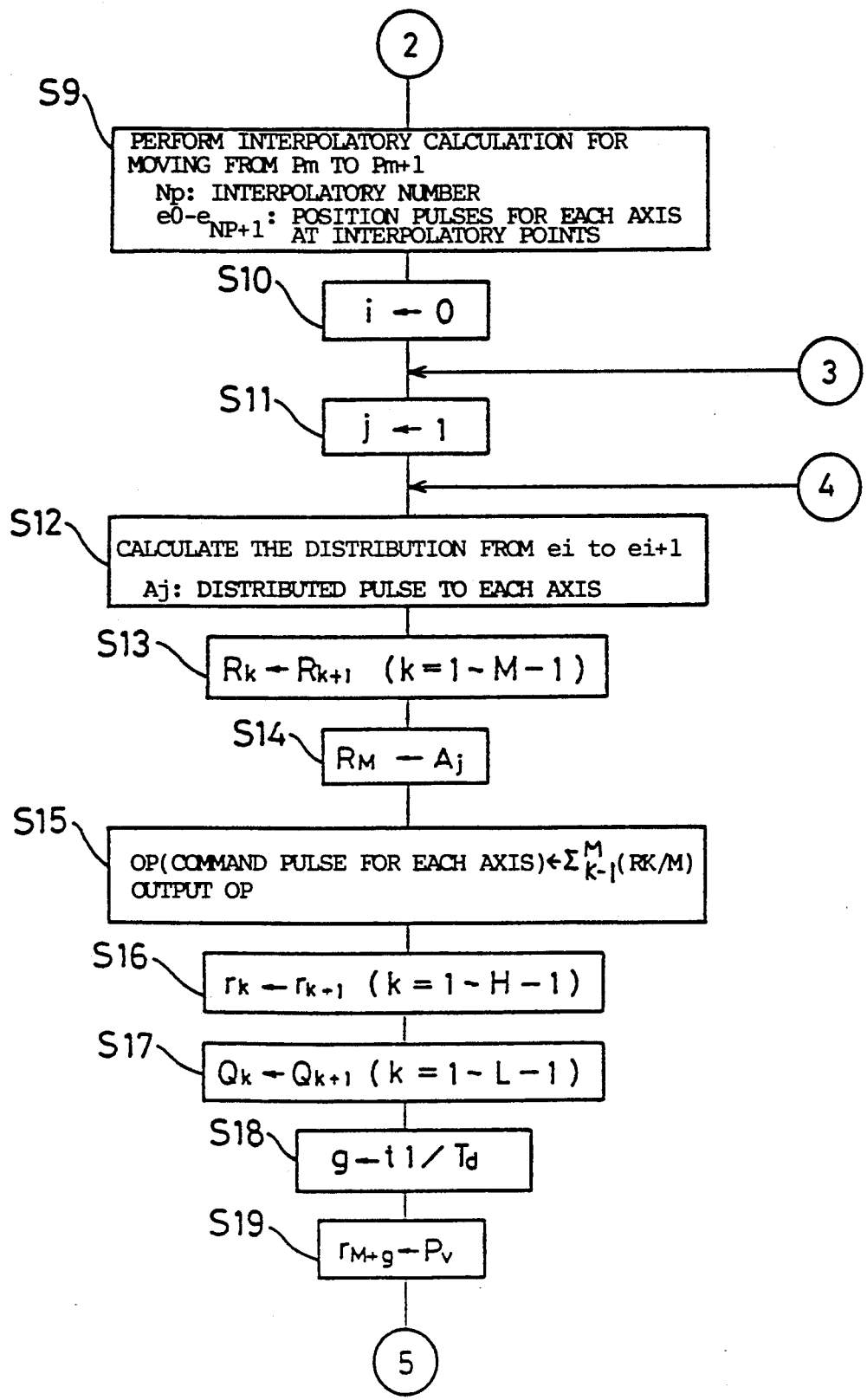
Figure 7C:
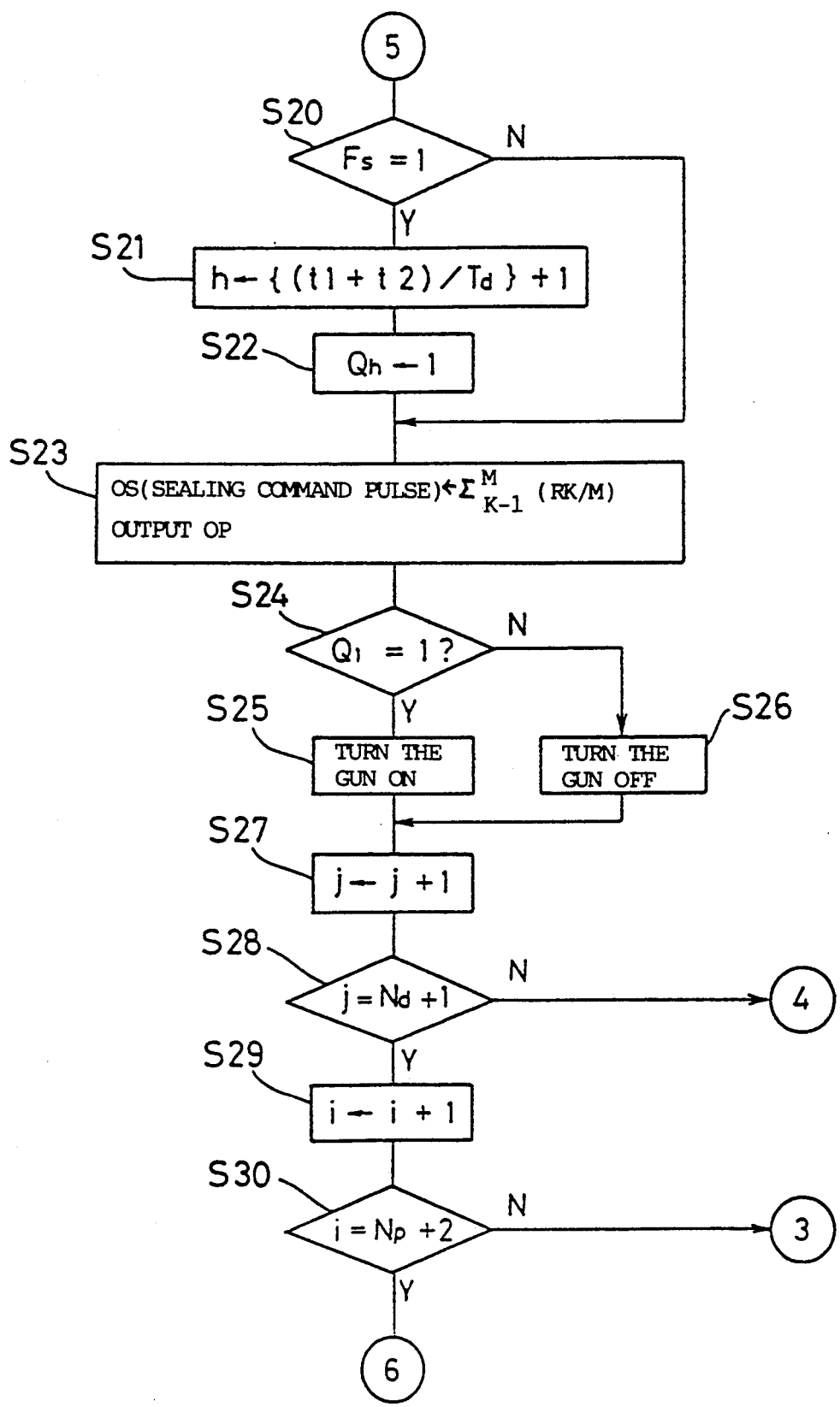
Figure 7D:
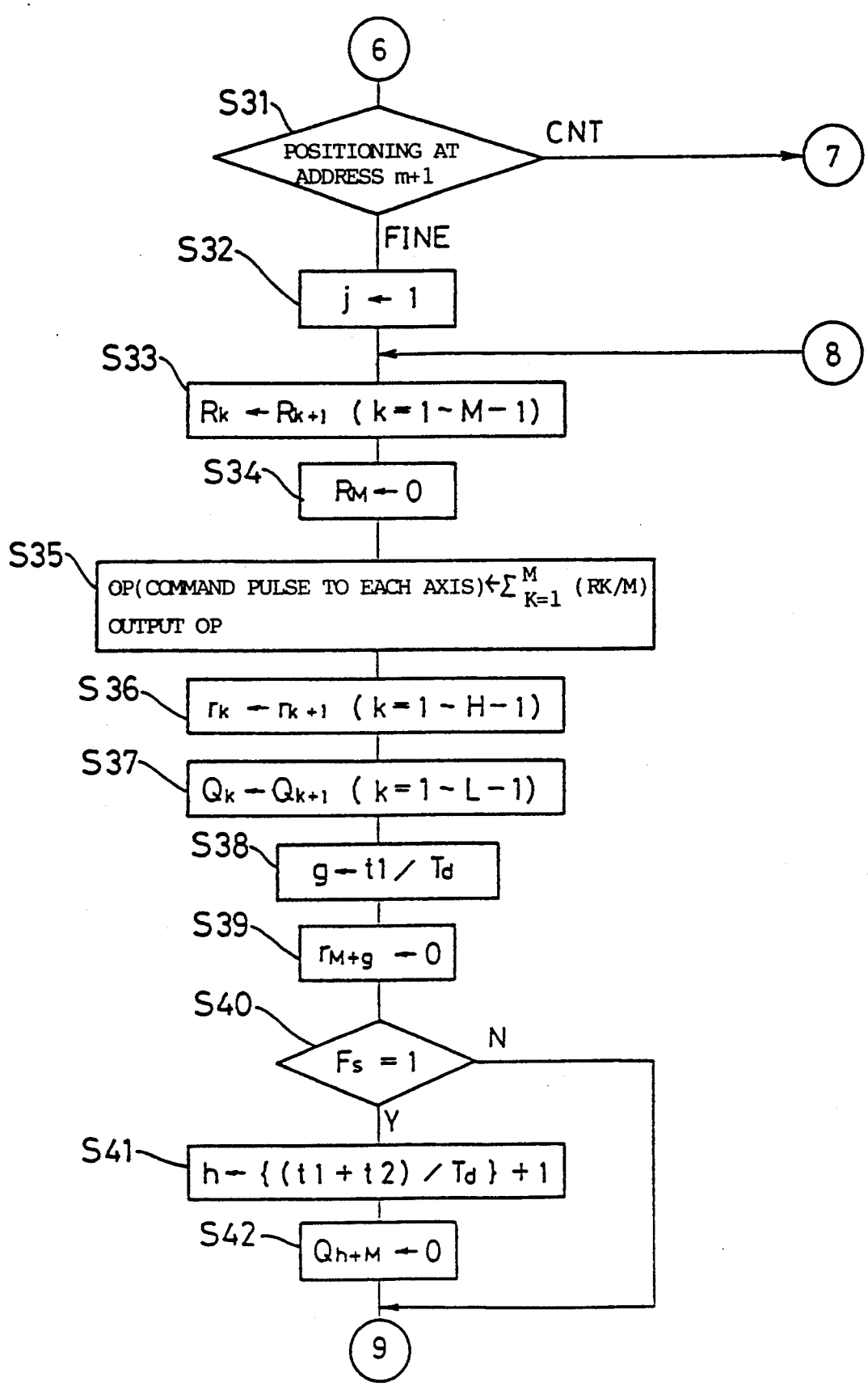
Figure 7E:
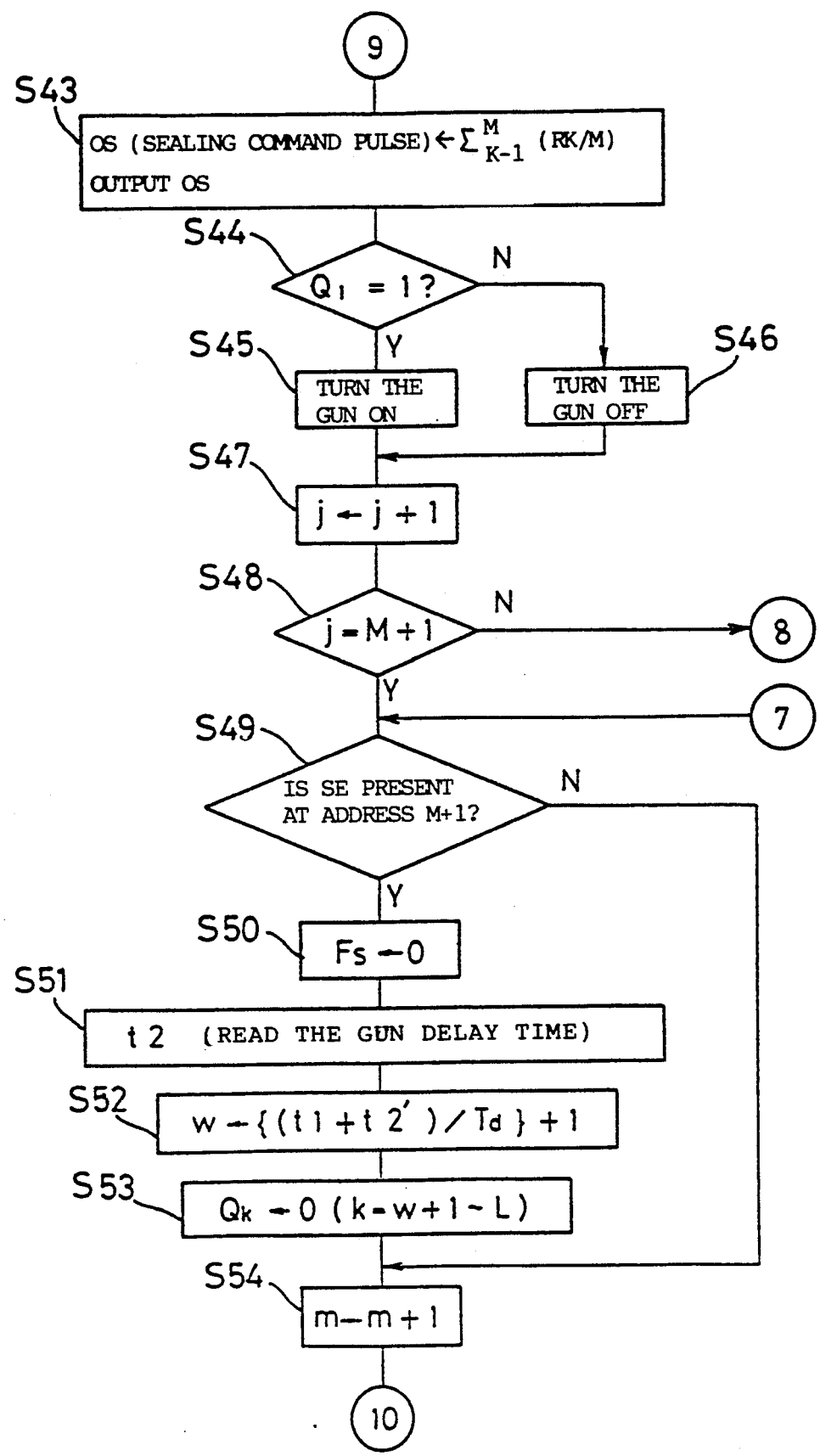
Figure 7F:
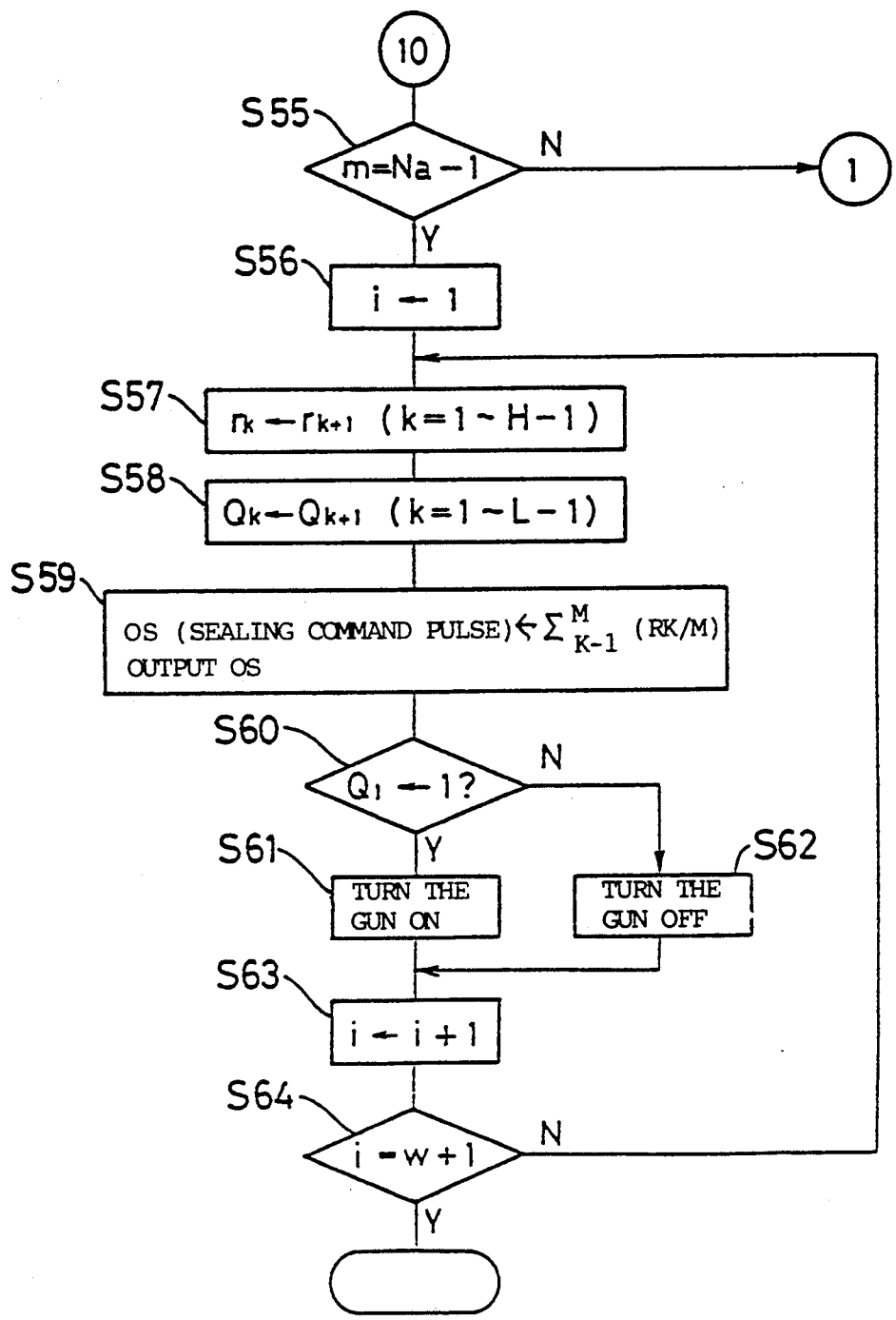

FIG. 6 shows an example wherein sealing is started and ended with positioning ignored (t2=a set value, t2'=a set value).

The sealing operation according to the present embodiment is performed as described above. The following explains the operation with reference to the flowcharts, shown in FIG. 7(a) through (d), of the processing steps carried out by the processor (CPU) of the robot control unit 10.

First, before beginning to teach the operation program to the robot, the sealing start code SS, b, and the sealing end code SE, t2' are programmed for teaching the locations to be sealed, and this program is stored in the memory of the robot control unit 10.

When the robot is set for the operation mode to start its operation, the processor of the robot control unit 10 first carries out initialization, so that all the sealing ON flag Fs, acceleration/deceleration registers R1 through RM for the respective axes of the robot, sealing acceleration/deceleration registers r1 through rH, gun ON registers Q1 through QL, an index "m" indicative of an address (pointer) number of the teaching program, and variables (registers for variables) g, h and w are set to "0." The processor also reads an address (pointer) number Na of the teaching program and stores it in a register (step S1). Next, the processor reads the data of the block of the address "m" indicated by the index "m" of the teaching program, i.e., the data including a target position Pm, speed Fm, CNT for ignoring positioning or FINE for positioning, sealing start code SS, and sealing end code SE (step S2). The explanation will now be given with reference to the examples shown in FIG. 3 through FIG. 6.

A. When sealing is started and ended at positioned points (processing shown in FIG. 3):

The processor first judges whether the sealing start code SS is present at the address "m" (step S3). In the case of the processing shown in FIG. 3, the code exists; therefore, the processor sets the sealing ON flag Fs to "1" (step S4), and reads the sealing conditions "f" (the flow of the sealant), c (command constant), t1 (servo delay time) and t2 (gun ON delay time), which are indicated by the sealing condition data number "b" of the code SS, b (step S5). Then, the processor reads the data at the following address m+1 (step S6), calculates the gun command voltage V (step S7) to be applied to the sealant application unit 30 according to the formula 2 based on the speed Fm+1, which is set at the address m+1, the sealant flow "f" and the command constant "c", which are read in the step S5, calculates a gun command pulse amount Pv, which corresponds to the voltage V, and stores it in a register (step S8).

In the next step, the processor performs interpolatory calculation for the movement from the position Pm indicated by the address "m" to the position Pm+1 indicated by the address m+1 to determine an interpolatory number Np and position pulses e0 through eNp+1 for each axis at the respective interpolatory points (step S9), sets an index "i" for counting the number of interpolatory cycles to "0," and an index "j" for counting the number of distribution cycles to "1," (steps S10 and S11), and performs the calculation of distribution from an interpolatory point ei to ei+1, thereby computing a distributed pulse amount Aj for each axis (step S12). The processor then stores the value of R2 in the acceleration/deceleration register R1, the value of R3 in R2, ... the value of RM in RM+1. More specifically, it shifts the value of each register by 1 (step S13), and sets the distributed pulse amount Aj, which has been determined in the step S12, in the register RM (step S14). Since the acceleration/deceleration registers R1 through RM have been set to "0" at the initializing stage, only the register RM stores the distributed pulse amount Aj, while all the remaining registers R1 through RM-1 store "0." The processor then adds up the values stored in the registers R1 through RM and divides the total by the number M of the acceleration/deceleration registers to determine the command pulse amount Op, then outputs this command pulse Op (step S15).

The processing from these steps S12 through S15 is the acceleration/deceleration processing for the moving speed of the robot. In FIG. 7, for the simplicity of the explanation, the acceleration/deceleration processing for only one axis is shown in the steps S13 through S15, but there are as many processes, each consisting of steps S13 through S15, as the number of axes that the robot has. For each axis, the processing consisting of the steps S13 through S15 is carried out with respect to the distributed pulse amount Aj of each axis determined in the step S12, thereby performing the acceleration/deceleration processing. The robot begins its action when command pulses are given to the respective axes.

Figure 8:
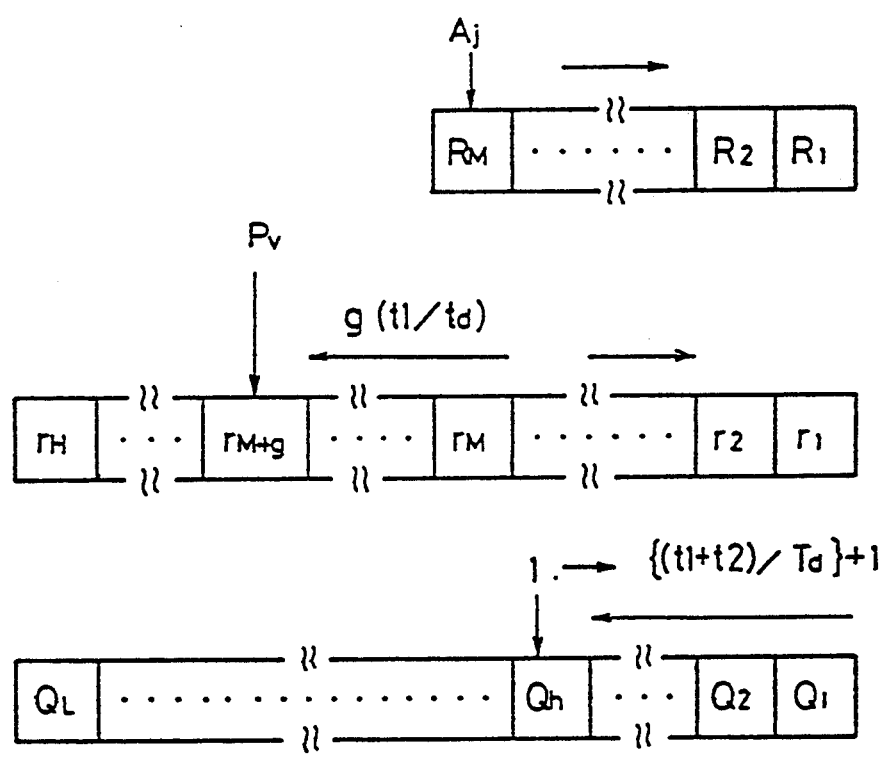
FIG. 8 is an explanatory drawing which illustrates the positional relationship for data storage in registers at the time of acceleration or deceleration.

Next, the data stored in the sealing acceleration/deceleration registers r1 through rH and in the gun ON registers Q1 through QL are shifted by one. This means that the data to be stored in the register rk+1 is shifted to the register rk (k=1 through H-1), whereas the data stored in the register Qk+1 is shifted to the register Qk (k=1 through L). Since all registers have been initialized to "0" in the step S1, there is no change in the data at the present point of time. The numbers of the sealing acceleration/deceleration registers r1 through rH and of the gun ON registers Q1 through QL are sufficiently larger than the number of the acceleration/deceleration registers R1 through RM for each axis (M<H, L) (steps S16 and S17). Then, the servo delay time t1 read in the step S5 is divided by a distribution cycle Td to determine the value of a variable "g" (step S18). The processor then stores the gun command pulse amount Pv determined in the step S8 in a sealing acceleration/deceleration register rM+g, which corresponds to the value resulting from adding the value of the variable "g" determined in the step S18 to the number M of the acceleration/deceleration registers (step S19). Next, the processor judges if the sealing ON flag Fs is "1" (step S20), and since the flag has been set to "1" in the step S4, the processor divides the value, which results from adding the gun ON delay time t2 to the servo delay time t1 read in the step S5, by the distribution cycle Td, and further adds "1" to this result to determine the value of a variable "h," then sets "1" in a gun ON register Qh which corresponds to the variable "h" (steps S21 and S22). FIG. 8 is an explanatory drawing which illustrates the setting of the registers during the processing implemented in the steps S13 and S14 and the steps S18 through S22. The distributed pulse Aj for each axis is stored in the Mth register RM of the axis acceleration/deceleration registers, and the gun command pulse amount Pv is stored in the sealing acceleration/deceleration register rM+g separated by "g" from the Mth register in the opposite direction from the shifting direction; therefore, "1" is set in the hth gun ON register Qh, while "0" is stored in other registers. Then, the value resulting from adding the values stored in the first through Mth sealing acceleration/deceleration registers r1 through rM is divided by M, which corresponds to the number M of the axis acceleration/deceleration registers, to determine a sealing command pulse Os, and this sealing command pulse Os is supplied to the sealing gun control unit 31 of the sealant application unit 30 (step S23). The robot control unit 10 converts this sealing command pulse to a voltage of an analog amount through a D/A converter, and sends this voltage as a command voltage to the sealing gun control unit 31. At the present time point, the value of this sealing command pulse is "0" as can be seen from FIG. 8.

Next, the processor determines whether the value of the first gun ON register Q1 is "1," and since the value is still "0," it sends the gun OFF signal to the sealing gun control unit 31 to hold the sealing work in a stop state (steps S24 and S26). The processor then increments the index "j" of the distribution cycle by "1", and judges whether this value of the index "j" is equal to the number which is greater than a predetermined number of times Nd of distribution by "1" (steps S27 and S28);

if the value is not equal to the predetermined number of times, then the processor goes back to the step S12 to repeat the aforesaid processing until the index "j" reaches Nd+1. Each time the processing from the step S12 through the step S28 is implemented, the registers R1 through RM, r1 through rH, and Q1 through QL are shifted, thus setting a distributed pulse amount in the register RM, a gun command pulse amount in the register rM+g, and "1" in the register Qh in sequence.

When the processing comprising the aforesaid steps S12 through S28 is repeated "g" times, i.e., at the time point at which a delay by the servo delay time t1 takes place, the value of the register rM becomes the value of the gun command pulse amount Pv. It is not until this time point that the resulting sealing command pulse amount Os becomes Pv/M (the values of other registers r1 through rM-1 are "0"). When sealing is started at the positioned point as shown in FIG. 3, since the gun ON delay time t2 has been set to "0," the register Q1 becomes "1" after the registers are shifted "g" times (after a delay by the servo delay time t1 takes place) like the case described above, and the processor advances from the step S24 to a step S25 wherein it issues the gun ON command to the sealing gun control unit 31, thereby causing the sealing gun 32 to discharge the sealant. The then discharge flow is 1/M of the gun command pulse amount Pv, which corresponds to the commanded speed. In addition, since the moving speed of the robot, i.e., the moving speed of the sealing gun delays from the movement command by the servo delay time t1, the command pulse amount, which was first distributed to each axis, becomes Aj/M and 1/M of the commanded speed Fm+1. In the next distribution cycle, the command pulse amount Op supplied to each axis becomes 2Aj/M, and the sealing command pulse amount Os becomes 2Pv/M; therefore, the flow of the sealant gradually increases in proportion to the moving speed of the robot (sealing gun) as shown in FIG. 3.

When the index "j" reaches Nd+1, the processor increments the interpolation index "i" by "1," and determines whether the index "i" has reached the number which is greater than the interpolatory number Np, which was calculated in the step S9, by 2 (steps S29 and S30); if it has not yet reached the number, then the processor goes back to the step S11 to repeat the processing from the step S11 to the step S30, thereby causing the robot (sealing gun) to move along the route between interpolatory points. When the processing from the step S12 through the step S28 has been repeated by the number M of the axis acceleration/deceleration registers, the distributed pulse amounts for the respective axis, which correspond to the commanded speed Fm+1, are stored in the individual axis acceleration/deceleration registers R1 through RM; therefore, the moving speed of the robot (sealing gun) reaches the commanded speed, delaying by the servo delay time t1, and the acceleration section is completed. The gun command pulse amounts Pv, which correspond to the commanded speed Fm+1, are stored in the sealing acceleration/deceleration registers r1 through rM, delaying by the servo delay time t1; therefore, after that, a command voltage, corresponding to the gun command pulse amounts, which in turn correspond to the commanded speed, is supplied to the sealing gun control unit 31, and the sealing gun 32 discharges the sealant at a flow rate corresponding to the commanded speed. In this way, the flow of the sealant is controlled in proportion to the moving speed.

When the index "i" reaches Np+2, the processor advances from the step S30 to the step S31, and judges whether the command, which is given at the next address m+1 and read in the step S6, is CNT for ignoring positioning or FINE for performing positioning. If the block at the next address is CNT, for instance, then the processor goes from the step S31 to the step S49, and judges whether there is the sealing end code SE at the address m+1 (step S49). In the case shown in FIG. 3, the code SE is not present. Therefore, the processor goes to the step S54 wherein it increments the address "m" by "1", and determines whether the address "m" is equal to a number, which is smaller than the program address number Na by "1" (step S55); if it is not equal, then the processor returns to the step S3 to repeat the processing from the step S3 on after that.

The steps of the processing are implemented in sequence, and, if the commanded speed changes during the processing of the next block, the moving speed of the robot (sealing gun) is subject to acceleration/deceleration as previously described, and the flow of the sealant is also accelerated or decelerated according to the moving speed of the robot (sealing gun). This causes the flow to change in proportion to the speed, thereby ensuring a uniform bead section.

After that, as long as CNT exists in the next address m+1, the processor repeats the processing of the steps S3 through S31, S49, S54 and S55. In the case of the operation shown in FIG. 3, the FINE and SE codes are given at the address of the block which terminates the sealing; therefore, during the processing of the block preceding that block, the processor moves from the step S31 to the step S32, sets the index "j" to "1," shifts the axis acceleration/deceleration registers R1 through RM in the same manner as described above, stores "0" in the Mth register RM (steps S33 and S34), adds up the values stored in the registers R1 through RM, divides the result by the number M of the registers to determine the command pulse Op for each axis, and sends the same to the servo circuit for each axis (step S35).

As in the steps S16 and S17, the processor shifts the registers r1 through rH, and Q1 through QL (steps S36 and S37), and divides the servo delay time t1 by the distribution cycle Td to determine the value of the variable "g" (step S38).

The processor then sets "0" in the sealing acceleration/deceleration register rM+g, which corresponds to the value obtained by adding the value of the variable "g" determined in the step S38 to the number M of the acceleration/deceleration registers (step S39). Next, since the sealing ON flag Fs is "1," the processor moves from the step S40 to the step S41, divides the value, which is obtained by adding the ON delay time t2 (t2=0 in the case of the operation shown in FIG. 3) to the servo delay time t1, by the distribution cycle Td, sets "0" in a gun ON register Qh+M, which corresponds to a value resulting from adding the number M of the axis acceleration/deceleration registers to a value "h" obtained by adding "1" to the value obtained in the immediately preceding arithmetic operation, adds up the values stored in the sealing acceleration/deceleration registers r1 through rM, divides the result by "M" to determine the sealing command pulse amount Os, which is subject to D/A-conversion and supplied to the sealing gun control unit 31 (steps S40 through S43).

Next, the processor determines whether the register Q1 is "1". When the register Q1 still retains "1," the processor issues the gun ON command to the sealing gun control unit 31 (steps S44 and S45), increments the index "j" by "1", and judges whether the resulting index "j" is M+1 (steps S47 and S48). If the index is not M+1, then the processor goes back to the step S33, and repeats the processing of the steps S33 through S48 "M" times until the index "j" reaches M+1. When the processor repeats the processing M times, all values stored in the axis acceleration/deceleration registers R1 through RM become "0"; the command pulses Op for each axis also become "0"; and the movement command "0" is given to the robot. The robot itself, however, is operated delaying by the servo delay time t1, and therefore the robot itself is kept moving. Even when the processing of the steps S33 through S48 is repeated M times, not all the sealing acceleration/deceleration registers r1 through rM become "0," and the registers r1 through rg have the values of the gun command pulse amount Pv, which correspond to the speed commanded for the previous block. The registers Q1 through Qh (h=g) also hold the value "1," and, therefore, even when the command pulse for each axis to the robot become "0," the sealing gun 32 discharges the sealant at a decelerated flow rate.

When the index "j" reaches M+1, the processor moves from the step S48 to the step S49. Since the sealing end code SE has been set to the address m+1, the processor advances to the step S50, sets the sealing ON flag Fs to "0," reads the gun delay time t2', which has been set at the same time as the sealing end code SE (t2'=0 for the operation shown in FIG. 3), divides the value, which is obtained by adding the gun delay time t2' to the servo delay time t1, by the distribution cycle Td, adds "1" to that value to obtain a value "w" (t2'=0; therefore, w=h=g), and sets for "0" all the values of gun ON registers Qw+1 through QL which are respectively obtained by adding "1" to the values "w," through L. As a result, the registers Q1 through Qw (=Qg=Qh) will be set for "1" (steps S51 through S53).

The processor then increments the address "m" by "1," and determines whether the address "m" is smaller than the number of the program addresses (the number of pointers) Na by "1" (steps S54 and S55). If both the robot action and sealing are to be stopped at a positioned point in the case of the operation illustrated in FIG. 3, m=Na−1; therefore, the processor proceeds to a step S56, sets the index "i" to "1," shifts the registers r1 through rH and Q1 through QL, adds up the values stored in the registers r1 through rM, divides the result by "M," outputs the obtained value as the sealing command pulse Os, and judges whether the register Q1 is "1"; when it is still "1," the processor issues the gun ON command, increments the index "i" by "1," judges whether the value of the index "i" is w+1 (=h+1=g+1), and repeats the processing of steps S57 through S64 until the index "i" reaches w+1. More particularly, the processing is repeated for the number of times "g" (=h=w), which corresponds to the servo delay time t1, and repeating it for the number of times "g" causes the register Q1 to become "0", and all the values of the registers r1 through rH to "0." As a result, the program moves from the step S60 to the step S62, and issues the gun OFF command to stop the sealing work.

In this manner, even if the robot moves delaying by the servo delay time t1, and stops delaying by that time, the sealing gun starts discharging the sealant delaying by the servo delay time t1, and stops discharging it, also delaying by that time, thereby controlling the discharged flow of the sealant according to the moving speed of the robot (sealing gun).

If the sealing end is specified at the positioned point, and only the robot moves to the following step as shown in FIG. 3, the address "m" will not become Na−1 in the step S55, and so the processor returns from the step S55 to the step S3 to begin the processing for the next block. The next block, however, does not have the sealing start code SS, and so the processor moves from the step S3 to the step S6. During the repetitive processing of the steps S6 through S10 and the steps S11 through S29, the processor shifts the registers r1 through rH and Q1 through QL in the steps S16 and S17, and stores the gun command pulse amount Pv in the register rM+g in sequence. In this case, the flag Fs is not "1," so that the processor moves from the step S20 to the step S23 without implementing the processing of the steps S21 and S22, and therefore the register Qh will not be set to "1". Since the processor implements the processing of the steps S23, S24 and S25, the register Q1 becomes "0" delaying by the servo delay time t1 just as in the case of the processing of the steps S57 through S64, and all the registers Q1 through QH become "0," causing the gun OFF command to be issued, and the sealing work to be terminated.

B. When the sealing is started with positioning ignored and ended at a positioned point (in the case of the operation illustrated in FIG. 4):

In this case, the processor proceeds to the steps S1, S2, and S3, but, since the sealing start code SS does not exist in the step S3, the processor jumps from the step S3 to the step S6, and carries out the processing of the steps S6 through S8. In the step S9, the interpolatory computation from the command position Pm to Pm+1 is implemented; the processing of the aforesaid steps S10 through S30 is performed; the acceleration/deceleration processing for each axis is performed in the steps S12 through S15; and the robot (sealing gun) is accelerated and controlled to reach the commanded speed.

Meanwhile, in the steps S16 and S17, the registers r1 through rH and Q1 through QL are shifted, and the gun command pulse amount Pv is stored in the register rM+g in sequence. Since the flag Fs is "0," the processor jumps from the step S20 to the step S23 skipping the steps S21 and S22. Thus, the sealing command pulse amount Os is issued but the register Q1 will not become "1", so that the processor jumps from the step S24 to the step S26, and will not issue the gun ON command, thereby prohibiting the sealing gun from discharging the sealant.

Thus, after finishing the processing of a block, the processor moves from the step S30 to the step 31. If the positioning specified by the next address is CNT, the processor jumps from the step S31 to the step S49. Since the sealing end code SE is not specified at the next address m+1, the processor proceeds to the step S54, updates the address by "1", and, if the value of the address "m" is not equal to the value of Na−1 (step S55), it goes back to the step S3. After this point on, the operations of the steps S3 through S55 described above are repeated, and only the robot (sealing gun) moves.

When the processor detects that the sealing start code SS is present at the address "m" in the step S3, it carries out the operations of from step S4 on as are mentioned above. In this case, in the steps S21 and S22, the processor divides the value, which is obtained by adding the gun ON delay time t2 to the servo delay time t1, by the distribution cycle Td, adds "1" to this result in order to determine the value of the variable "h," and sets "1" in sequence in the gun ON register Qh corresponding to the variable "h", thereby causing the register Q1 to become "1". Thus, the gun ON command is issued delaying by the time obtained by adding the gun ON delay time t2 to the servo delay time t1. In this case, the gun command pulse amount Pv, which corresponds to the speed for the previous block, is stored in the first half of the registers r1 through rM+g, while the gun command pulse amount Pv, which corresponds to the speed command for the new block, is stored in the latter half; therefore, the sealing command pulse amount Os, which is determined in the step S23, corresponds to the acceleration or deceleration for changing from the speed of the previous block to the speed of present block. When shifting is implemented until the distributed pulse amount Aj for the block is stored in the acceleration/deceleration registers R1 through RM, and the gun command pulse amount Pv, which corresponds to the speed command for the block, is stored in the registers r1 through rM, the speed of the robot (the speed of the sealing gun) reaches the commanded speed, and also provides the sealing command pulse amount Os which corresponds to the speed command for the block, thereby controlling the flow of the sealant so that it changes in proportion to the moving speed of the robot (sealing gun).

C. When sealing is started at a positioned point and terminated with positioning ignored (in the case of FIG. 5):

The sealing work is carried out by the same processing as that described with reference to FIG. 3, at the start of sealing. When the processor finds the sealing end code SE at the address m+1 as it implements the processing and proceeds from the step S31 to the step S49, the processor sets the flag Fs to "0" (step S50), reads the gun delay time t2' (step S51), determines the value "w" to be obtained by dividing the value, which is obtained by adding the gun delay time t2' to the servo delay time t1, by the distribution cycle Td and by adding "1" to the result (the number of the distribution cycles during the time, t1+t2') (step S52), and sets all the registers Qw+1 through QL to "0" (step S53). The processor then updates the address "m" by "1," and if the value of the address "m" is not equal to the value of Na-1 (in the case of FIG. 5, it is not equal to the value because the commanded block follows), the processor moves from the step S55 to the step S3. The processor carries out the processing of the step S3 and the steps S6 through S10, and repeats the processing of the steps S11 through S30. In the steps S16 and S17, the registers "r" and Q are shifted in sequence, and the gun command pulse amount Pv is stored in the register rM+g in order, but, since the flag Fs is "0," the processor jumps from the step S20 to the step S23, skipping the processing of the steps S21 and S22. Therefore, when "0," which has been set in the step S53, appears in the register Q1 (when the servo delay time t1 and the gun delay time t2' have elapsed), the processor moves from the step S24 to the step S26 to cause the gun 32 to stop discharging the sealant.

D. When sealing is started and ended with positioning ignored (in the case of FIG. 6):

For starting the sealing work, the processing explained with reference to FIG. 4 is implemented, whereas the processing explained with reference to FIG. 5 is implemented for ending the sealing work.

In the present invention, the flow of the sealant is controlled in proportion to the moving speed of the sealing gun which is driven by the robot. This makes it possible to discharge the sealant at a flow rate matching the moving speed of the sealing gun even during the acceleration or deceleration of the sealing gun, thereby ensuring a uniform bead width of the sealant applied to a sealing section of a machine or apparatus.

We claim:

1. A sealant flow control method in sealing by an industrial robot, wherein a sealing gun of a sealant application unit is attached to a distal end of an arm of the industrial robot which is controlled by a robot control unit, and the flow of a sealant discharged from the sealing gun is controlled in accordance with a signal issued from the robot control unit to a sealing gun control unit of the sealant application unit, characterized in that said method comprises;

(a) programming a combination of a sealing start command and a sealing condition number which specifies various sealing conditions, and a combination of a sealing end command and a preset gun OFF delay time in a teaching program when teaching to the robot is made, and (b) in a process of acceleration control of an operation of the robot arm, i.e., an operation of the sealing gun, effected by pulse distribution for each block from the moment the operation starts to the moment a commanded speed is reached, and in a process of deceleration control of the operation effected upon completion of the pulse distribution from the commanded speed until when the operation is ended;

(b1) controlling the sealant flow in synchronism with and in the same pattern as the robot arm operation during said acceleration control process from the moment the robot arm operation starts, in case that a sealing start position is position-commanded by a sealing condition number combined with the sealing start command, to thereby determine the sealant flow to a value which is proportional to the moving speed of the robot arm, and starting the sealing with a delay of a servo delay time plus a gun ON delay time preset under the sealing condition, relative to the sealing start command, and determining the sealant flow to a preset value, in case that ignoring of positioning the sealing start position is commanded by the sealing condition number, and (b2) controlling the sealant flow in synchronism with and in the same pattern as the robot arm operation during said deceleration control process from the moment the pulse distribution is completed to the moment the arm operation is ended, in case that a sealing end position is position-commanded by a set value of the gun OFF delay time, to thereby determine the sealant flow to a value which is proportional to the moving speed of the robot arm, and causing the sealing to be ended delaying from the sealing end command by the gun OFF delay time plus the servo delay time, in case that ignoring of positioning the sealing end position is commanded by a set value of the gun OFF delay time.

2. The sealant flow control method in sealing by an industrial robot according to claim 1, wherein the sealing condition number combined with the sealing start command specifies values of various sealing conditions including a preset sealant flow value, the servo delay time, and the gun ON delay time, and positioning to the sealing start position is permitted by setting the gun ON delay time to zero, while the sealing start is carried out with the positioning ignored by setting the gun ON delay time to a value other than zero; and wherein positioning to the sealing end position permitted by setting the gun OFF delay time combined with the sealing end command to zero, while the sealing end is carried out with the positioning ignored by setting the gun OFF delay time to a value other than zero.

3. The sealant flow control method in sealing by an industrial robot according to claim 2, wherein the sealing conditions specified by the sealing condition number further include a conversion constant for determining a command voltage applied to the sealant application unit from the sealant flow and the commanded speed for the robot arm, i.e., the sealing gun moving speed.

4. The sealant flow control method in sealing by an industrial robot according to claim 3, wherein a command voltage V, which represents the magnitude of a signal supplied to the sealing gun control unit of the sealant application unit, is given by the following formula:

$$V = [F/1000] \times f \times c$$

where
F: Commanded speed for the robot (m/sec)
f: Sealant flow (cc/m)
c: Conversion constant (V/(cc/sec)).

* * * * *